United States Patent
Schilling

(10) Patent No.: US 7,099,532 B2
(45) Date of Patent: *Aug. 29, 2006

(54) DEVICE FOR OPTICAL SIGNAL TRANSMISSION BETWEEN TWO UNITS MOVABLE RELATIVE TO EACH OTHER

(75) Inventor: Harry Schilling, Eichstätt (DE)

(73) Assignee: Schleifring und Apparatebau GmbH, Fürstenfeldbruck (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/989,233

(22) Filed: Nov. 15, 2004

(65) Prior Publication Data

US 2005/0116154 A1    Jun. 2, 2005

Related U.S. Application Data

(63) Continuation of application No. PCT/DE03/01535, filed on May 13, 2003.

(30) Foreign Application Priority Data

May 16, 2002    (DE) ................. 102 22 221

(51) Int. Cl.
*G02B 6/26*    (2006.01)

(52) U.S. Cl. ............................... 385/31; 385/88

(58) Field of Classification Search ............... None
See application file for complete search history.

(56) References Cited

U.S. PATENT DOCUMENTS

| 3,843,267 | A | * | 10/1974 | Vital et al. ................ 356/225 |
| 4,330,870 | A | | 5/1982 | Arends |
| 4,761,777 | A | * | 8/1988 | Edwards et al. ............. 398/91 |
| 5,015,057 | A | | 5/1991 | Rumbaugh et al. |
| 5,297,225 | A | | 3/1994 | Snow et al. |
| 5,506,410 | A | * | 4/1996 | Sakurai et al. ............. 250/551 |
| 6,018,411 | A | * | 1/2000 | Fukushima et al. ......... 359/283 |
| 6,075,613 | A | * | 6/2000 | Schermer et al. ........... 356/446 |
| 6,580,853 | B1 | * | 6/2003 | Harrison et al. ............. 385/31 |
| 6,614,016 | B1 | * | 9/2003 | Degen ..................... 250/231.1 |
| 6,943,937 | B1 | * | 9/2005 | Lelic et al. ............ 359/337.11 |
| 6,996,300 | B1 | * | 2/2006 | Schilling ..................... 385/12 |

FOREIGN PATENT DOCUMENTS

| JP | 58-171137 | 10/1983 |
| JP | 59-110232 | 6/1984 |
| JP | 59-111432 | 6/1984 |

OTHER PUBLICATIONS

International Search Report, PCT/DE 03/01535, mailed Nov. 11, 2003.

* cited by examiner

*Primary Examiner*—Juliana Kang
(74) *Attorney, Agent, or Firm*—Kevin L. Daffer; Daffer McDaniel, LLP

(57) ABSTRACT

A device for transmitting optical signals between at least two units movable relative to each other comprises an adjustable attenuating member for achieving a system attenuation which is independent of the relative position of the units movable relative to each other.

19 Claims, 1 Drawing Sheet

DEVICE FOR OPTICAL SIGNAL TRANSMISSION BETWEEN TWO UNITS MOVABLE RELATIVE TO EACH OTHER

CROSS REFERENCE TO RELATED APPLICATIONS

This application is a continuation of pending International Application No. PCT/DE03/01535 filed May 13, 2003, which designates the United States and claims priority from pending German Application No. 102 22 221.5 filed May 16, 2002.

BACKGROUND OF THE INVENTION

1. Field of the Invention

The invention relates to a device for optical transmission of data by means of light guides, in which a transmitter and/or a receiver can be moved or differently positioned along a light guide.

Devices of this kind are utilized for example in a linear configuration in crane systems or other conveyor systems for transmitting data between a movable crane and a stationary control unit. Another field of application of these data transmission systems in a circular configuration is a transmission between parts that are rotatable relative to each other, such as, for example, in a computer tomograph between a rotor for supporting an X-ray tube and a detector, and a stationary evaluation unit for processing and displaying image data.

2. Description of the Prior Art

In prior art transmission systems based on light guides, light is coupled into one end of a light guide and then guided through the light guide to the other end thereof where, once again, it is evaluated by a suitable receiver. A multitude of variants, based on this, are known and make possible a simultaneous transmission at a plurality of wavelengths by means of filters, or also a transmission to a plurality of different locations, for example by means of Y couplers. However, systems of this kind are not suitable for coupling signals in or out laterally at arbitrary positions on a light-guiding fiber. For this, various other technologies are known.

A device of this kind is described in U.S. Pat. No. 5,297,225. Here, light coupled in from the outside through notches formed on the outside of the light-guiding medium is deflected by reflections at such angles that it can be guided inside the medium. A transmission device of this kind is expediently usable when coupling-in is to be performed at fixed given positions. Basically it may also be used for a transmission between movable units, because coupling-in or -out of light is performed without contact. However, if a long path of movement is required, as is the case with crane systems or even rotary transmission systems of large diameter, then a very high attenuation results from the many notches along the light-guiding medium. Because of this, extreme demands are made on the dynamic ratio of the receiver. For a path length of several meters, a typical attenuation of this arrangement of about 10 dB per meter overtaxes conventional optical receivers. Therefore, for long transmission paths this transmission system is practicable only with unusually expensive optical components involving large outlay.

Because the technical principles of operation of rotary transmission are the same as those of linear or curved transmission, the following expositions will make no further distinction between them. The terms will be used synonymously. Furthermore, no distinction will be made between the terms light-wave guides and light guides, because their functions are comparable as far as the invention is concerned, although light-wave guides are preferably used in technical practice. Thus, for example, a light guide which is formed substantially by a trench having a mirror surface is suitable for transmitting. A light guide of this kind is disclosed in U.S. Pat. No. 4,525,035.

BRIEF SUMMARY OF THE INVENTION

The invention is based on the object of providing an optical data-transmission system which makes only small demands on the dynamic ratio of an optical receiver, even with transmission media having high attenuations. In accordance with the present invention, this object is achieved by a device for transmitting optical signals between at least two units movable relative to each other, comprising a first unit comprising a light guide disposed along a track of movement; a second unit comprising a coupler movable along the light guide for coupling optical signals into or out of the light guide; at least one light source; at least one light sink; and at least one optical path between the light source and the light sink; the light source(s) and the light sink(s) being optionally assigned to the first unit and the second unit, respectively, or to the second unit and the first unit, respectively; at least one variable optical attenuating member being provided in the optical path for maintaining an optical attenuation of the optical path within a given range of tolerance.

In accordance with the present invention, the above object is also achieved by a device for transmitting optical signals between at least two units movable relative to each other, comprising a first unit comprising a light guide disposed along a track of movement; a second unit comprising a coupler movable along the light guide for coupling optical signals into or out of the light guide; at least one light source; at least one light sink; and at least one optical path between the light source and the light sink; the light source(s) and the light sink(s) being optionally assigned to the first unit and the second unit, respectively, or to the second unit and the first unit, respectively; the at least one light source comprising means for electrically controlling an emitted optical power; and a control unit being provided for controlling the optical power of the light source in such manner that the optical power at an input of the light sink of an assigned optical path is within a given range of tolerance.

BRIEF DESCRIPTION OF THE DRAWING

In the following the invention will be described by way of example, without limitation of the general inventive concept, with the aid of embodiments and with reference to the drawings.

Figure 1:
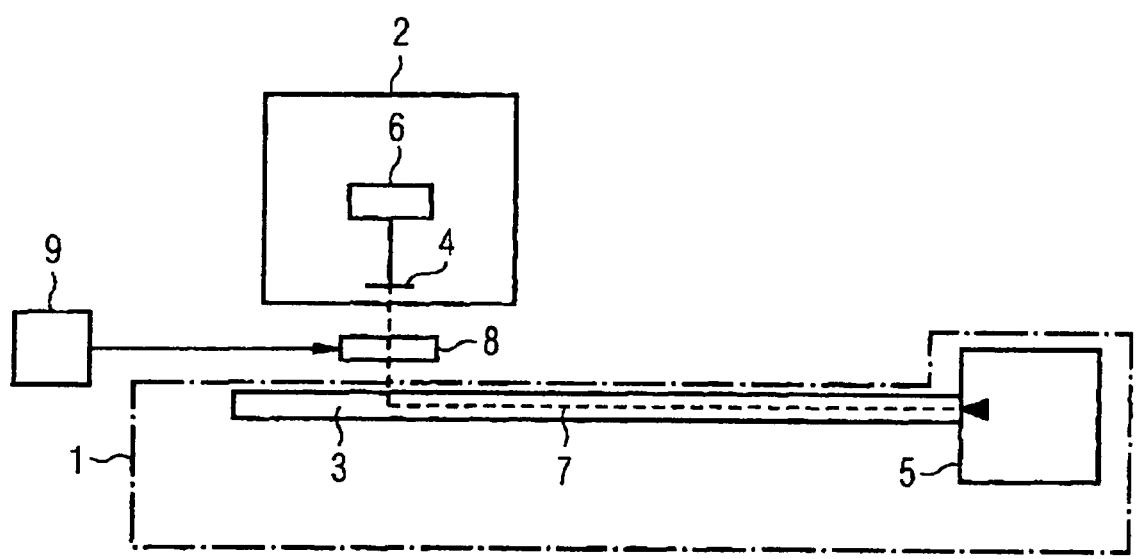
FIG. 1 schematically shows in a general form a device according to the invention.

Here, by way of example, a first unit 1 comprises a linearly configured light guide 3. A second unit 2 is disposed to be movable along this light guide. For optical signal transmission, the first unit 1 comprises a light source 5 which couples optical signals into the light guide 3. These are guided along the light guide 3 and coupled out into the second unit 2 at the position of the latter. The coupling-out is effected by means of a coupler 4 which transmits the coupled out light into a light sink 6. This optical path from the light source 5 to the light sink 6 is shown as a dotted line 7. Furthermore, a variable optical attenuating member 8 is provided in the optical path for maintaining the attenuation of the entire optical path at a constant value, or within a given range of tolerance. Optionally, the variable attenuating member may be assigned to the first unit, or also to the second unit. For controlling the attenuating member, a control unit 9 is provided which signals to the attenuating member the necessary setting of the attenuation.

LIST OF REFERENCE NUMERALS

1 first unit
2 second unit
3 light guide
4 coupler
5 light source
6 light sink
7 optical path
8 optical attenuating member
9 control unit

DETAILED DESCRIPTION OF THE INVENTION

The transmission device in accordance with the invention comprises at least one first unit which has a light guide disposed along a path of movement. Furthermore, at least one second unit is provided which has a coupler that is movable along the light guide for coupling optical signals into or out of the light guide. The generation of the light is effected by at least one light source. The light transmitted by the device is finally passed to a light sink.

The manner of operation of the device according to the invention is independent from the direction of transmission of the light. Therefore one or a plurality of light sources, or one or a plurality of light sinks, may be assigned optionally to the first unit or also to the second unit. Therefore, basically two optical paths may be constructed.

In the first optical path the light source couples light into the light guide of the first unit. This light is coupled out by a coupler of the second unit and passed to a light sink. Optionally a plurality of couplers for further optical paths may be provided. These further optical paths are designed to correspond to the first optical path, and will therefore not be expressly mentioned any more, however, they are to be considered as being included. In the same way, additional light sources may be disposed also at further ends of the light guide.

The second optical path comprises a light source which couples light into the light guide of the first unit by means of a coupler of the second unit. This light is now guided through the light guide to at least one light sink.

A plurality of couplers may be used also in this form of the invention to couple light from one or a plurality of light sources into the light guide. Because these transmission paths also correspond to a simple transmission path, they will not be expressly mentioned any more, but they should be considered as being included.

The mechanisms of the operation of the optical transmission along the different optical paths are mainly the same, but not relevant to the present invention. Therefore no distinction will be made between the various optical paths.

According to the invention, at least one variable optical attenuating member is provided in an optical path. This optical attenuating member maintains the optical attenuation of the optical path within a given range of tolerance. Thus, the attenuation of the optical path is at least substantially independent from mechanical movements of the first unit to the second unit. Therefore, substantially smaller demands are made on the dynamic ratio of the optical receiver.

When compared with prior art, the device of the invention therefore has a higher but constant overall attenuation under all conditions of operation.

Of course, various attenuating members, optionally also having different attenuations, may be provided for various signal paths. Thus, for example in the case of a transmission with different wavelengths, an attenuation in accordance with the optimal transmission characteristics of each wavelength is practicable.

In a further advantageous embodiment of the invention, a variable optical attenuating member is provided for maintaining the optical attenuation of the optical path at a given constant value.

In a further advantageous embodiment of the invention a control unit is provided for setting the optical attenuating member in such manner that the optical attenuation of the optical path is within a given range of tolerance. The use of a control unit of this kind makes it possible to also use active or controllable optical attenuating members.

Another embodiment of the invention provides for at least one light source to have means for electrically controlling its emitted optical power. These are controlled by means of a control unit in such manner that the optical power at the input of the light sink of the assigned optical path lies within a given range of tolerance. Preferably the optical power remains at a constant value.

In a further advantageous embodiment of the invention, at least one light sink is designed as a converter of optical signals to electrical signals. Furthermore, this has means for electrically controlling the electrical sensitivity or amplification, and is controlled by means of a control unit in such manner that the electrical signal amplitude lies within a given range of tolerance. Preferably, the signal amplitude remains at a constant value.

A control unit on which this invention is based may be designed to be mechanical, for example as a toothed gearing, or also pneumatic, but preferably electrical or electronic.

In a further advantageous embodiment of the invention, at least one variable optical attenuating member is designed as an optically active medium. An optically active medium of this kind changes its attenuation according to the intensity of incident light. In this case, a high attenuation is achieved at a high light intensity, and a low attenuation at a low light intensity.

In another embodiment of the invention, at least one variable optical attenuating member is designed as a stop, as used for example with camera objective lenses. Stops of this kind can be produced simply and at favorable cost. A multitude of completely developed different control means are available on the market.

In another advantageous embodiment of the invention, at least one optical attenuating member is formed as a neutral density wedge filter. The neutral density wedge filter is inserted into the path of the rays to an extent corresponding to the required attenuation. This may be achieved, for example, with a linear or rotational movement. Micromechanical elements also may be used here.

Another embodiment of the invention provides for at least one variable optical attenuating member to be designed as a doubly refracting element. Doubly refracting elements of this kind may be LCDs (Liquid Crystal Displays), for example. In this case the attenuation may be effected by absorption, deflection, or polarization of the light.

Further possibilities of achieving changeable attenuating members consist in the use of controllable scattering centers which, for example, are based on photorefractive or photo-addressable materials, or also on materials which have material properties changeable by outside fields. In the same way, materials having a controllable refractive index, or materials having a controllable transmission may be used. Materials of this kind may be, for example, photorefractive or photo-addressable, or may also have material properties which are changed by outside fields or supplied energy. Control of the attenuation may be made, for example, by varying outside electromagnetic fields.

For effecting an attenuation, the materials described here may be incorporated in a separate attenuating means, or also in the light guide itself. It is of particular advantage to provide the attenuating elements in or on the boundary layer of the fiber. For this, particles having properties, such as refractive index or transmission, which may be controlled from the outside, for example by electromagnetic waves, are introduced into the fiber core, or at boundary faces to the sheath.

The attenuation of the fiber may also be controlled by providing a controllable grid on the fiber boundary layer. The particles or the grid may be distributed along the entire fiber, or optionally disposed at certain discrete locations.

Apart from a continuously adjustable attenuation, basically an attenuation which is adjustable in given steps also can be provided with all embodiments presented here. This may be achieved, for example, with an attenuating member that can be switched in steps.

In another advantageous embodiment of the invention, the control unit is designed to perform control in dependence upon the relative position of the first unit with respect to the second unit. With most known transmission paths, the attenuation is dependent exclusively on the relative distance between the first unit and the second unit. This attenuation can now be determined using measurement techniques, or by calculation, as a function of the distance, and used for performing control. For example, a position encoder or an angle encoder can be employed for detecting the position.

Another embodiment of the invention consists in the control unit being incorporated by feedback into a regulation loop for regulating an output quantity. With the provision of this regulation loop, constant transmission characteristics of the entire transmission path may be achieved, even without dependence upon other parameters such as temperature, ageing etc.

In another advantageous embodiment of the invention, the control unit is designed as a mechanical unit. For example, this may be a toothed gearing. Thus, for example in the case of a computer tomograph, a neutral density wedge disposed on a rotating disk can be moved synchronously with a movement of the rotor by means of a toothed gearing.

The invention claimed is:

1. Device for transmitting optical signals between at least two units movable relative to each other, comprising:
   a first unit comprising a light guide disposed along a track of movement;
   a second unit comprising a coupler movable along the light guide for coupling optical signals into or out of the light guide at different locations along the light guide;
   at least one light source;
   at least one light sink;
   at least one optical path between the light source and the light sink, wherein the optical path comprises at least a portion of the light guide;
   wherein at least one variable optical attenuating member is provided in the optical path for maintaining an optical attenuation of the optical path within a given range of tolerance.

2. Device according to claim 1, wherein the at least one variable optical attenuating member is provided in the optical path for maintaining the optical attenuation of the optical path at a given constant value.

3. Device according to claim 1, wherein a control unit is provided for adjusting the optical attenuating member in such manner that the optical attenuation of the optical path is within the given range of tolerance.

4. Device according to claim 3, wherein at least one light sink designed to be a converter of optical signals to electrical signals comprises means for electrically controlling an electrical sensitivity or amplification, and wherein a second control unit is provided for controlling the electrical sensitivity or amplification of the light sink in such manner that an electrical signal amplitude is within the given range of tolerance.

5. Device according to claim 3, wherein the control unit is designed to perform control in dependence upon a relative position of the first unit with respect to the second unit.

6. Device according to claim 3, wherein the control unit is incorporated by feedback into a regulation loop for regulating an output quantity.

7. Device according to claim 1, wherein the light source(s) and the light sink(s) are optionally assigned to the first unit and the second unit, respectively, or to the second unit and the first unit, respectively.

8. Device for transmitting optical signals between at least two units movable relative to each other, comprising:
   a first unit comprising a tight guide disposed along a track of movement;
   a second unit comprising a coupler movable along the light guide for coupling optical signals into or out of the light guide at different locations along the light guide;
   at least one light source;
   at least one light sink;
   at least one optical path between the light source and the light sink, wherein the optical path comprises at least a portion of the light guide; and
   wherein the at least one light source comprises means for electrically controlling an emitted optical power; and
   a control unit provided for controlling the emitted optical power of the light source in such manner that the optical power at an input of the light sink of an assigned optical path is within a given range of tolerance.

9. Device according to claim 8, wherein at least one light sink designed to be a converter of optical signals to electrical signals comprises means for electrically controlling an electrical sensitivity or amplification, and wherein a second control unit is provided for controlling the electrical sensitivity or amplification of the light sink in such manner that an electrical signal amplitude is within a given range of tolerance.

10. Device according to claim 8, further comprising at feast one variable optical attenuating member, which is provided in the optical path for maintaining an optical attenuation or the optical path within a given range of tolerance.

11. Device according to claim 10, wherein the at least one variable optical attenuating member is designed to be an optically active medium, which changes its attenuation according to an intensity of incident light.

12. Device according to claim 10, wherein the at least one variable optical attenuating member is designed to be an optical stop or aperture that can be changed to obtain a required optical attenuation.

13. Device according to claim 10, wherein the at least one variable optical attenuating member is designed to be a neutral density wedge, which is inserted into the optical path according to a required optical attenuation.

14. Device according to claim 10, wherein the at least one variable optical attenuating member is designed to be a doubly refracting element.

15. Device according to claim 14, wherein the doubly refracting element is an LCD (Liquid Crystal Display).

16. Device according to claim 8, wherein the control unit is designed to perform control in dependence upon a relative position of the first unit with respect to the second unit.

17. Device according to claim 8, wherein the control unit is incorporated by feedback into a regulation loop for regulating an output quantity.

18. Device according to claim 8, wherein the control unit comprises a mechanical gear.

19. Device according to claim 8, wherein the light source(s) and the light sink(s) are optionally assigned to the first unit and the second unit, respectively, or to the second unit and the first unit, respectively.

* * * * *

UNITED STATES PATENT AND TRADEMARK OFFICE
CERTIFICATE OF CORRECTION

PATENT NO. : 7,099,532 B2 Page 1 of 1
APPLICATION NO. : 10/989233
DATED : August 29, 2006
INVENTOR(S) : Schilling It is certified that error appears in the above-identified patent and that said Letters Patent is hereby corrected as shown below:

IN THE CLAIMS:

Col. 6, line 60: Please delete "feast" and substitute --least--.

Col. 6, line 62: Please delete "or" and substitute --of--.

Signed and Sealed this

Seventeenth Day of April, 2007

JON W. DUDAS
*Director of the United States Patent and Trademark Office*